No. 729,973. Patented June 2, 1903.

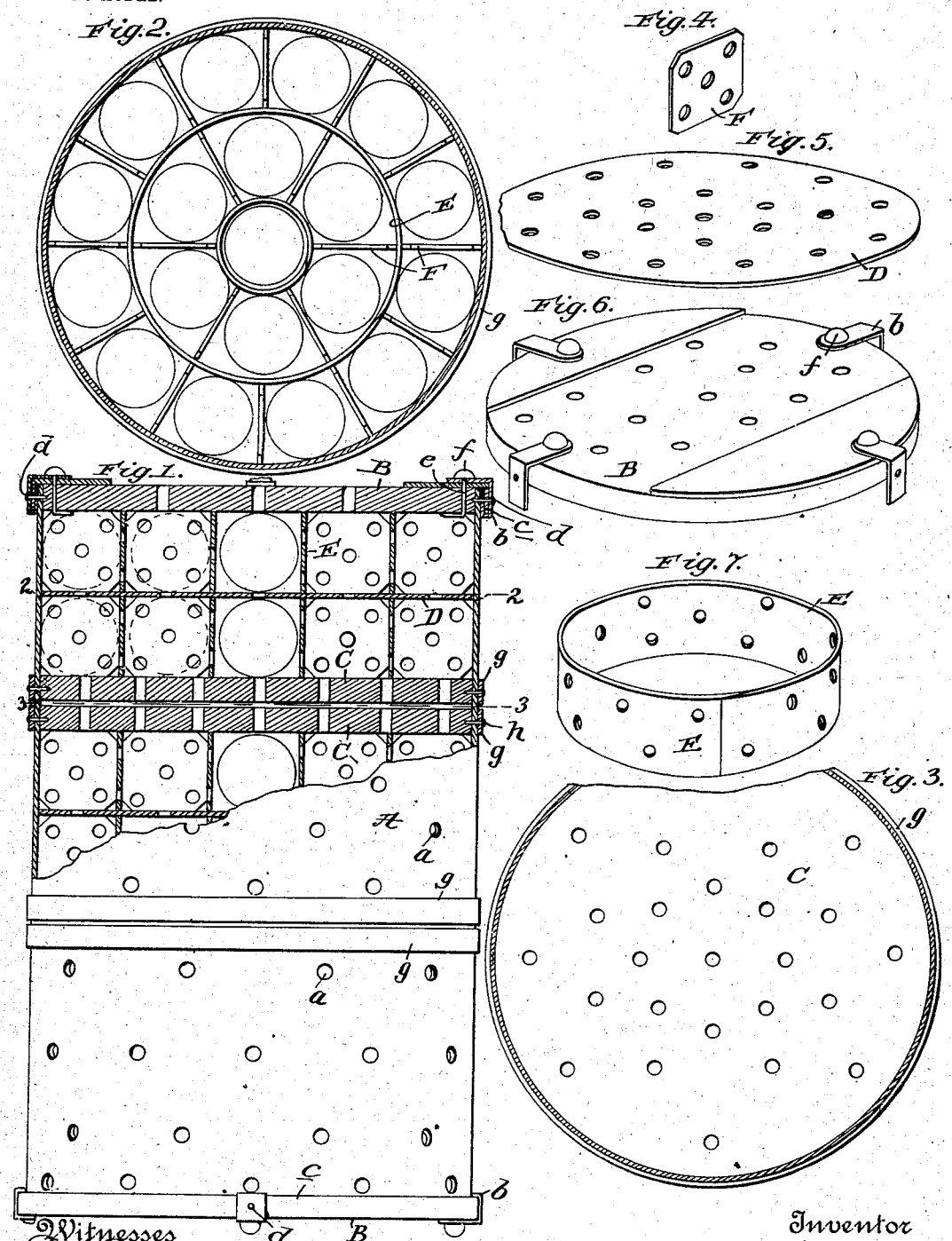

UNITED STATES PATENT OFFICE.

WELLS R. STOKELY, OF ST. AUGUSTINE, FLORIDA.

FRUIT-BOX.

SPECIFICATION forming part of Letters Patent No. 729,973, dated June 2, 1903.

Application filed September 15, 1902. Serial No. 123,472. (No model.)

*To all whom it may concern:*

Be it known that I, WELLS R. STOKELY, a citizen of the United States, residing at St. Augustine, in the county of St. Johns and State of Florida, have invented new and useful Improvements in Fruit-Boxes, of which the following is a specification.

My invention relates to fruit-boxes—i. e., boxes designed more especially for the shipment of oranges, apples, and the like; and it has for its general object to provide a box which in addition to embodying means for separating or holding the oranges or other pieces of fruit apart with a view of permitting the free circulation of air between the same is adapted when it reaches its destination to be readily divided into a number of smaller boxes, each complete in itself and of a shape and size to be conveniently placed in a basket or carried under the arm of a purchaser of the fruit.

With the foregoing in mind the invention will be fully understood from the following description and claims when taken in conjunction with the accompanying drawings, in which—

Figure 1 is a view, partly in side elevation and partly in vertical section, of my improved box; Figs. 2 and 3, transverse sections taken in the planes indicated by the broken lines 2 2 and 3 3, respectively, of Fig. 1; Fig. 4, a perspective view of one of the radial partitions removed; Fig. 5, a similar view of one of the horizontal partitions removed; Fig. 6, a perspective view of one of the heads as it appears when removed from the box-body, and Fig. 7 a perspective view of one of the circular partitions removed.

Similar letters of reference designate corresponding parts in all of the views of the drawings, referring to which—

A is the body of my improved box, which in the preferred embodiment of the invention is cylindrical in form and made of veneer, provided with apertures $a$, as shown, and B B are apertured heads designed to be placed in the ends of the body and connected thereto through the medium of metallic straps $b$ or other suitable fastenings. The straps $b$ have their inner ends interposed between the body and end hoops $c$ thereon and connected to said body and hoops by nails $d$, while their outer portions are bent over the heads and connected thereto by nails $e$, clenched or upset at their inner ends and provided at their outer ends with knobs $f$. These latter serve, when the box is set on end, to hold the lower head above the ground and permit air to enter the box through the apertures of said head.

C C are what I will for convenience of description term "combined heads and partitions." These combined heads or partitions are preferably provided with apertures, as shown, and are arranged in pairs in the body at intermediate points of the length thereof and quite close together. They are also arranged in the same planes as intermediate hoops $g$, to which and the body A they are connected by nails $h$. The space between the inner combined partitions or heads C and the spaces between the outer combined partitions and heads C and the heads B are designed to be filled with oranges or other fruit in the manner hereinafter described, and when so packed the box is adapted to be shipped as a whole. When the box reaches its destination and it is desirable to sell the oranges or other fruit in small quantities and original packages, the dealer has but to saw through the body A between the hoops $g$ of the two pairs, when the box A will be divided into three small boxes each complete in itself and of a shape and size to be conveniently carried under the arm or in a market-basket.

In packing the box I prefer to separate the horizontal layers of oranges, apples, or the like by foraminated partitions D, one of which is shown in each of the three fruit-receiving spaces of the boxes, and to separate the oranges or apples of each layer by means of the foraminated circular partitions E and foraminated radial partitions F after the manner best shown in Fig. 2. I may also, if deemed necessary, adapt the radial partitions F to engage the circular partitions, so that each of said radial partitions will remain in an upright position and prevent contact of the oranges at opposite sides of the same in the event of one of said oranges becoming decayed and soft.

When oranges, apples, or pieces of other fruit are packed in the box in the manner described, it will be observed that air is free to circulate at all sides of each piece of fruit, and hence the liability of any piece decaying is reduced to a minimum. It will also be observed that each piece of fruit is carried in such manner that there is little liability of it being bruised or otherwise injured incident to handling of the box.

The combined partitions and heads C and the hoops $g$ materially increase the strength of the box, and the hoops $g$ also serve to enable the dealer to readily determine where to saw in order to divide the box into several small boxes.

As will be readily appreciated from the foregoing description, my improved box is simple and inexpensive in construction and is possessed of a capacity almost, if not quite, as large as that of an ordinary box of corresponding size.

I have entered into a detailed description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having described my invention, what I claim, and desire to secure by Letters Patent, is—

1. A box comprising a body closed at its ends, partitions secured in the body sufficiently far apart to permit of the passage of a saw between them, and hoops secured on the outer side of the body with their adjacent edges coincident with the adjacent sides of the partitions, for the purpose described.

2. A box comprising a body, apertured heads arranged in the ends of the body, fastenings connecting the heads and body and having knobs on the outer side of the former, and partitions secured in the body at a slight distance apart, whereby, when the body is severed between the partitions, the box will be divided into a plurality of boxes.

3. A box comprising a body having openings, apertured heads arranged in the ends of the body, fastenings connecting the heads and body and having knobs on the outer side of the former, partitions secured in the body at a slight distance apart, whereby, when the body is severed between the partitions, the box will be divided into a plurality of boxes, apertured horizontal partitions arranged in the spaces of the box and adapted to separate horizontal layers of fruit, and apertured circular partitions and apertured radial partitions disposed at opposite sides of the horizontal partitions and adapted to separate the pieces of fruit of each layer.

In testimony whereof I have hereunto set my hand in presence of two subscribing witnesses.

WELLS R. STOKELY.

Witnesses:
J. L. M. NUTT,
E. C. McDONALD.